This invention relates to electrical insulation, and, more particularly, to a structure provided with integral locking means and insulation reinforcement effective upon positioning thereof in a slotted magnetic core.

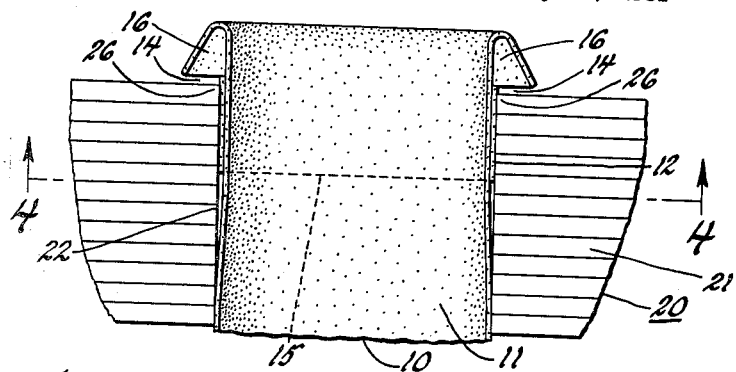
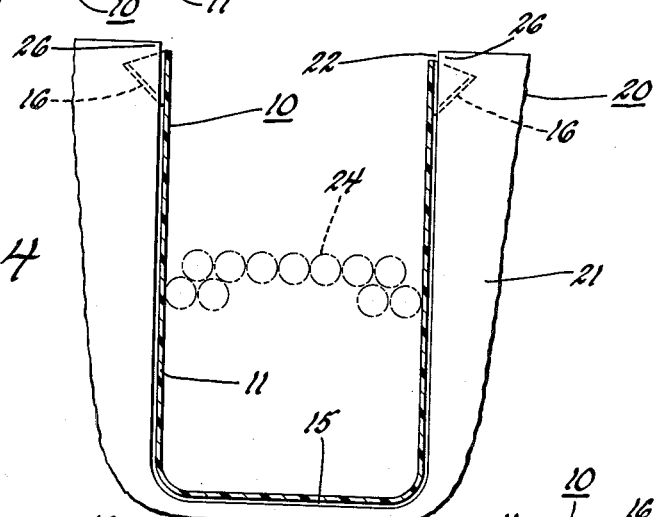
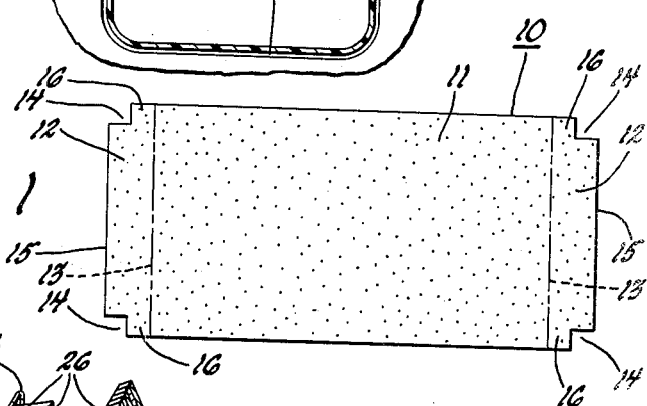
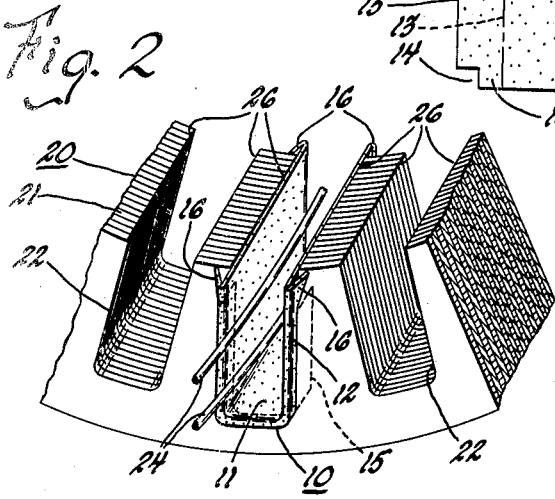
INVENTORS
William C. Profitt
Wilfred Johnson
BY
Albert H. Reuther
THEIR ATTORNEY 3,210,583
SLOT LINER FOR DYNAMOELECTRIC MACHINE
William C. Profitt, Dayton, Ohio, and Wilfred Johnson, Indianapolis, Ind., assignors to General Motors Corporation, Detroit, Mich., a corporation of Delaware
Filed July 25, 1961, Ser. No. 126,670
1 Claim. (Cl. 310—215)

An object of this invention is to provide a new and improved electrical insulation slot-lining structure inexpensive to produce, yet quickly insertable to be positioned against removal from a slot of a magnetic core provided with electrical conductors.

Another object of this invention is to provide a slot liner means of insulating material provided with combination lock-positioning and auxiliary cuff means adjacent to an end thereof whereby mechanical strength along edging is enhanced while effecting substantial savings in thickness and amount of insulating material for efficient mass production usage of individual slot liner means installed in multi-slot magnetic stator cores of dynamoelectric machines having conductors energizable therewith.

Another object of this invention is to provide a dynamoelectric machine slot liner device per se including integral end locking means to hold the same in a predetermined installed position within confines of a channel-like slot of a metal mounting member.

A further object of this invention is to provide a dynamoelectric machine with a magnetic core slot liner device per se including a body portion of insulating material substantially rectangular in shape having opposite cuff-like end portions with dual corner cutouts on each side thereof to fit complementary to corner edging of channel-like slots in the magnetic core.

Another object of this invention is to provide slot liner means of insulating material such as Mylar and the like, the increased cost of which is more than offset by savings in improved structure including a body portion initially substantially rectangular in shape except for diagonally opposite locking notches in corners of the cuff-like opposite ends adapted to mate and interlock with an edge of a channel-like slot having a predetermined width and depth in a laminated dynamoelectric machine core.

Further objects and advantages will become apparent from the following description, reference being had to the accompanying drawings wherein a preferred embodiment of the present invention is clearly shown.

In the drawings:
FIGURE 1 illustrates a blanked plan view of the insulating structure in accordance with the present invention.

FIGURE 2 is a fragmentary perspective view of the insulating structure installed in accordance with the present invention in a slot of a magnetic core.

FIGURE 3 is a plan view taken adjacent to one end of and into depth of one slot with insulating structure installed in a magnetic core as represented in FIGURE 2.

FIGURE 4 is a cross-sectional view taken along line 4—4 in FIGURE 3.

In a disclosure of a copending patent application Serial Number 6,445 filed February 3, 1960, now U.S. Patent 3,038,093, Needham, et al. issued June 5, 1962, there is reference to a dynamoelectric machine insulation system having all-acrylic insulation in various components variously positioned and used in a slotted magnetic core. Such components, for example, include slot-lining structure of electrical insulation material of which the cost per se is sometimes slightly higher than that of previously known and used materials such as paper and the like. For large scale economical use of slot-lining structure of new plastic materials it is often desirable to decrease thickness of the plastic insulating material without any sacrifice in insulating properties and strength. Accordingly, an improvement in slot-lining structure in accordance with the present invention can result in substantial savings in thickness and amount of such plastic insulating material quickly insertable to be positioned against removal from a slot of a magnetic core provided with electrical conductors and permitting use of costlier though improved materials including polyester laminates as well as polyester materials commercially known as Mylar.

In FIGURE 1 there is a blanked plan view of a slot-lining insulating structure generally indicated by numeral 10 and including a body portion 11 substantially rectangular in configuration with opposite integral end portions 12 adapted to be folded along lines 13 transversely relative to the length or larger distance of the body portion 11. Each of the opposite cuff-like end portions to one side of the lines 13 has a substantially T-shape or configuration as a result of dual corner cutouts or notches 14 on each side thereof in accordance with the present invention. FIGURES 2, 3 and 4 of the drawings illustrate positioning of slot-lining structure or slot liner means 10 in predetermined locations as installed in a multi-slot magnetic stator core of dynamoelectric machines. It is to be noted that intermediate the corner notches or cutouts there is an end extension or edging 15 of reduced width as compared with width of the body portion 11 such that this extension fits into opposite ends of a magnetic core slot to a limit governed by shoulders or abutments 16 adjacent to each notch or cutout 14 and located remote from each other in substantially diagonally opposite corners though integral with the T-shaped configuration, particularly at opposite ends of the crossbar of the T-shape.

FIGURE 2 includes a fragmentary perspective view of a dynamoelectric machine magnetic core generally indicated by numeral 20 as formed by a stackup of metal laminations 21, for example, each having slots 22 radially located therewith and aligned relative to each other into channel-like slots having a predetermined width and depth to receive electrical conductors or wiring 24.

As can be best seen in views of FIGURES 2, 3 and 4, each of the end portions 12 having the cutouts or notches 14 as well as abutments or shoulders 16 provides combination lock-positioning and auxiliary cuff means adjacent to opposite ends whereby mechanical strength along edging or opposite ends of the slots 22 is enhanced while permitting use of a single thickness of plastic insulating material for the body portion 11. Each notch or cutout 14 extends longitudinally for substantially one-half the distance from opposite ends or edging to the transverse fold or line 13 for forming the cuff-like end portions in accordance with the present invention. The plastic insulating material such as polyester and polyester laminates provides a resilience in the body portion 11 as well as integral opposite T-shaped end portions 12 thereof such that the shoulders or abutments 16 flex laterally outwardly away from each other as permitted by the notches or cutouts 14 while a reinforced double-thickness cuff is provided by folding along line 13 to cause the extension or edging 15 to be positioned directly in engagement with slot periphery of at least one or more of the opposite end laminations of a particular dynamoelectric machine magnetic stator core. For purposes of illustration, it is to be noted that the folded back cuff-like end portions can have a length of substantially a quarter of an inch and the cutouts or notches can extend therein for a distance of one-eighth of an inch for slot lining means to be used on smaller motors. Length of the body portion 11 can be such that combination lock-positioning and auxiliary cuff means can fit snugly on opposite sides of a magnetic core and complementary to the slots thereof such that the shoulders or abutments 16 mate and interlock adjacent to corner edges 26 of the slotted magnetic core. Each cuff-like end portion is doubled back so that dual pairs of opposite cutouts or notches 14 permit engagement of shoulders or abutments 16 against the corner edging 26 thereby locking the slot liner means 10 in position against removal from a slot. Resilient lateral outward flexing of the shoulders or abutments 16 causes edges thereof to engage surfaces or facing of end laminations so as to resist displacement of the slot liner means from the slot openings either axially or radially thereof. Use of the slot lining means 10 in accordance with the present invention is such that substantially half the thickness of plastic insulating material is required to effect a materials savings for making Mylar-insulated motors and the like competitive with paper-insulated units while at least maintaining an even enhancing mechanical strength along the edges of the stator iron of a laminated magnetic core particularly where electrical conductors or windings 24 exert pressure laterally. The T-shaped end portions make it possible to hold the slot linear means in a manner to prevent sliding thereof through the slot when the windings or conductors are inserted.

Mylar polyester material is a single polymer, polyethylene terephthalate, by name, which is synthesized from petroleum derivatives by a process of several steps. No chemical additives, and particularly no plasticizers, are required to give Mylar polyester material strength and flexibility. Even without plasticizers the Mylar polyester material retains its strength and flexibility over a relatively wide range of temperatures from −80° F. to +300° F., for example. The Mylar polyester material shrinks less than three percent at temperatures of up to 300° F. and thus dimensional stability is also an advantage. The Mylar material is inherently strong and tough and in effect, is virtually ageless free of any loss of strength, any imbrittlement, as well as any change resulting from exposure to heat, cold, wetness, or dryness under various operating conditions for a dynamoelectric machine. The Mylar polyester material has a low transmission rate for moisture vapor and provides excellent resistance to oils, greases and other chemicals while providing tear and impact strength as well as tensile strength. It is to be noted that the Mylar polyester material can be used in combination with polyethylene for the body portion and integral end portions of the slot liner means 10 in accordance with the present invention and in some instances, coatings of such plastic material can be vacuumized onto very thin paper. Mylar and laminations of Mylar can be readily punched and die formed successfully even at room temperatures and when used as an outer layer the resulting structure provides excellent chemical resistance and strength even when only thin gauging of the polyester material is used for cost reduction.

While the embodiments of the present invention as herein disclosed constitute a preferred form, it is to be understood that other forms might be adopted.

What is claimed is as follows:

An individual slot insulation lining means for a dynamoelectric machine having a laminated magnetic core with slots for receiving electrical conductors comprising a substantially rectangular sheet of resilient insulating material having substantially equal notched cut-outs at diagonally opposite rectangle corners thereby forming T-shaped portions at opposite ends thereof, a U-shaped body portion being formed in said insulating sheet intermediate said end portions and fitting within a slot of said magnetic core and being engaged by multiple electrical conductors assembled in said slot, said T-shaped end portions including an end extension portion extending between the notches of each lining end, said end extensions thereby having a width reduced from that of the integral body portion, said T-shaped end portions being folded along an edge between the U-shaped body portion and said end extension portion and being doubled back against the slot lining means wherein each of said end extension portions is positioned between the U-shaped body portion and said core slot, said T-shaped end portions also including shoulder portions being formed by lateral outwardly flexing portions located between said folded edge and said reduced width end extension portion and adjacent an edge of each of said corner notch cut-outs, said shoulder portions abutting the magnetic core at the slot ends along said edge of the corner notch cut-outs, thereby providing means for locking said slot lining means in a fixed position within said slot, said folded end portion providing said lining means with cuff ends extending beyond the core slot ends and being integral with the reduced width end extension portion having a doubled back position for a distance greater than that of the abutting shoulders to provide in combination strengthening and lock-positioning of said slot lining means.

References Cited by the Examiner

UNITED STATES PATENTS

| | | | |
|---|---|---|---|
| 2,473,332 | 6/49 | England | 310—215 X |
| 2,701,316 | 2/55 | Willits et al. | 310—215 |
| 2,778,964 | 1/57 | Balke | 310—215 X |
| 2,935,859 | 5/60 | Marvin | 310—215 X |
| 2,936,296 | 5/60 | Precopio et al. | 310—215 |

FOREIGN PATENTS

| | | |
|---|---|---|
| 536,994 | 2/57 | Canada. |
| 760,402 | 3/54 | Germany. |

MILTON O. HIRSHFIELD, *Primary Examiner.*

DAVID X. SLINEY, *Examiner.*